June 12, 1951 A. H. ROCHE ET AL 2,556,218
NEGATIVE FEEDBACK THERMIONIC AMPLIFIER
Filed April 5, 1947
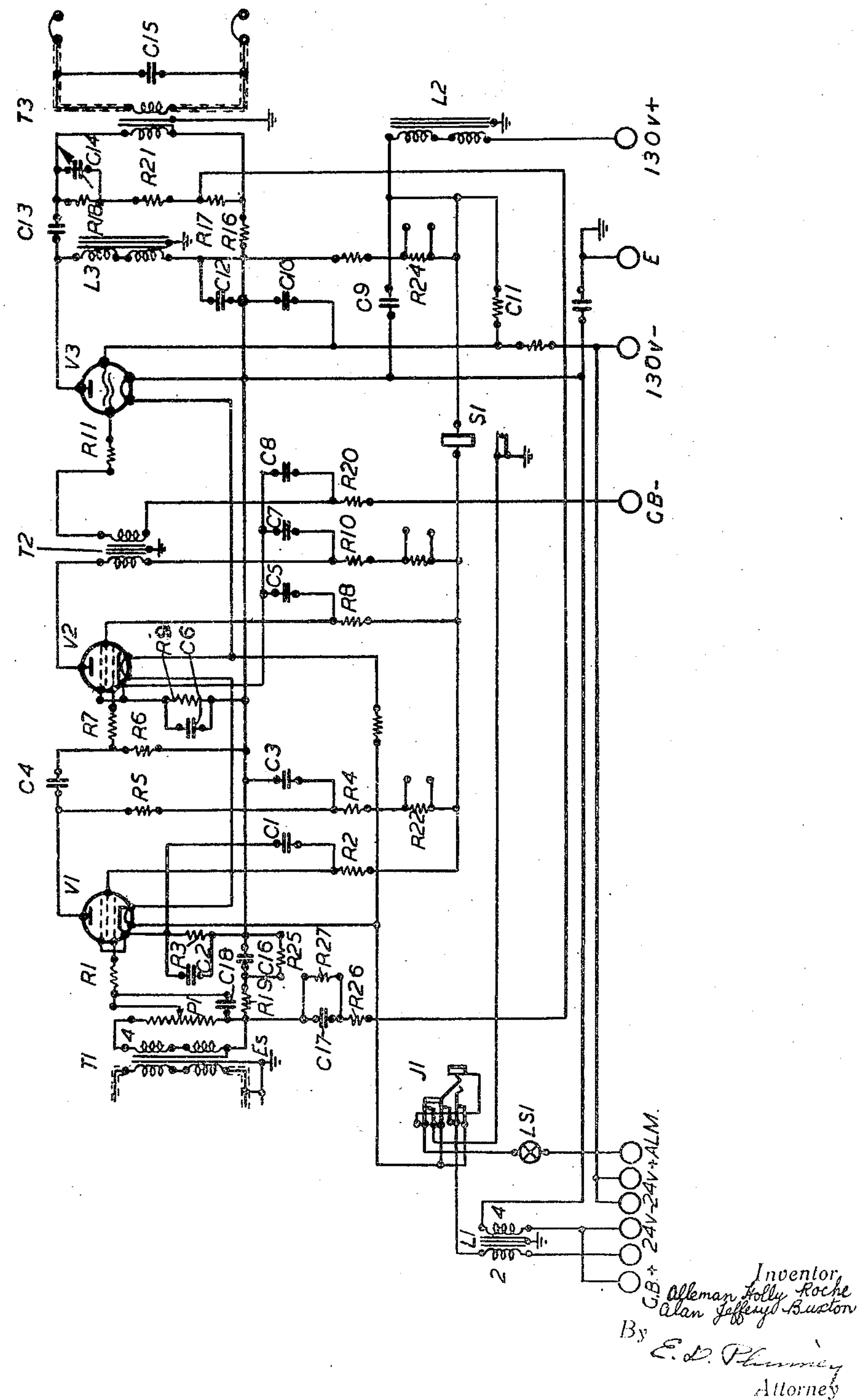
Inventor
Alleman Holly Roche
Alan Jeffery Buxton
By E. D. Phinney
Attorney Patented June 12, 1951

2,556,218

UNITED STATES PATENT OFFICE 2,556,218

NEGATIVE FEEDBACK THERMIONIC AMPLIFIER

Alleman Holly Roche and Alan Jeffery Buxton, London, England, assignors to International Standard Electric Corporation, New York, N. Y.

Application April 5, 1947, Serial No. 739,689
In Great Britain March 5, 1940

Section 1, Public Law 690, August 8, 1946
Patent expires March 5, 1960

3 Claims. (Cl. 179—171)

This invention relates to thermionic amplifiers and more particularly to such amplifiers in which a feedback circuit is provided for feeding back waves, including those of the range of transmitted frequencies, from the output to the input of the amplifier in negative phase, in order to reduce unwanted modulation, and/or non-linear effects and to render the gain stability greater than it would be without such feedback.

In such amplifiers in which gain control is effected outside the feedback path by means of a potentiometer across the secondary winding of the input transformer, the effect of negative feedback is to reduce the capacity between the grid of the first valve and earth to a very small value. At the maximum setting of the potentiometer the transformer capacity between the upper end of the secondary winding and earth is also reduced and is electrically identical in effect with the valve grid to earth capacity. As the gain of the amplifier is decreased by adjustment of the potentiometer, the effect of the feedback on the transformer capacity also decreases and this capacity increases until at the minimum setting it is substantially unaffected by feedback. Since the transformer capacity appears across the secondary winding of the transformer it will be appreciated that the input impedance of the amplifier will vary as the setting of the potentiometer is adjusted to vary the gain.

According to the invention in a negative feedback amplifier provided with a potentiometer of the above kind for varying the gain, means is provided for maintaining the input impedance substantially constant when the gain is varied. In a preferred arrangement, the effect of the decrease in capacity to ground of the transformer winding due to feedback when the gain is increased, is counteracted by an additional condenser connected between the slider of the potentiometer and the earthy end of the potentiometer winding.

The invention will be better understood from the following detailed description taken in conjunction with the accompanying drawing which shows a thermionic amplifier in which one method of carrying out the invention has been applied.

The amplifier has three stages of voltage amplification and one power output stage, with negative feedback applied between the output and input of the amplifier.

The frequency range is 12 kc. to 170 kc. The maximum gain is 65 db. being flat to within 1 db.

over the pass range and the power handling capacity is of the order of 1 watt. The input impedance is 600 ohms unbalanced while the output impedance is 600 ohms balanced to ground or any other desired impedance.

The incoming signals pass through a 600:10,000 ohm input transformer $T_1$ terminated by a 10,000 ohm potentiometer $P_1$ with its moving arm connected to the grid of the first tube $V_1$. The gain can be varied continuously over a 20 db. range by this means.

Two E. M. F.'s are applied in series across the grid and cathode of VI: one, the incoming signal, is developed across the moving arm and the earthy side of the potentiometer while the other, a voltage fed back from the output stage, is developed across the inductive resistance $R_{19}$ in series with the phase correcting impedances $C_{16}$ and $R_{25}$ in parallel. The effect of feedback is to reduce the capacity between the grid of $V_1$ and earth to a very small quantity. At the maximum setting of the potentiometer the transformer capacity between terminal 4 and earth is electrically identical in effect with the valve grid capacity and is also reduced. At the minimum setting, however, they are no longer identical in effect and the above transformer capacity is unaltered by feedback and appears across the high side of the input transformer.

This change in capacity is counterbalanced by that of a small condenser $C_{18}$ connected between the moving arm and the earthy side of the potentiometer. This capacity will not be reduced by feedback and its equivalent capacity across the high side of the transformer will vary with potentiometer setting. By the selection of a suitable value for this condenser $C_{18}$ the change in amplifier input impedance over the range of potentiometer can be made quite small.

To prevent capacity coupling between the two windings of the transformer two electrostatic shields ES are connected to each earthy side of the high and low impedance windings.

The first stage consists of a pentode $V_1$ with resistance $R_3$ shunted by condenser $C_2$ giving automatic bias, a resistive anode load $R_5$, with the screen and anode circuits being decoupled by $R_2$, $C_1$, $R_4$, $C_3$, respectively. To increase the gain of this stage the load resistance is made abnormally high and also the bias resistance is made large to keep the anode current down to a level such that the anode voltage does not drop below 60 v. The A. C. input is so small that the first stage harmonics are not important.

A voltage developed across the first stage load resistance $R_5$ is applied to the pentode $V_2$, via a coupling condenser $C_4$ and grid leak $R_6$. The second and third stages are coupled by unity ratio transformer $T_2$ with a self-capacity that, together with its associated parallel capacities in the circuit, resonates at about 50 kc. Automatic bias for $V_2$ is developed across the resistance $R_9$ in parallel with $C_6$. The screen and anode circuits are decoupled by $R_8$, $C_5$, $R_{10}$, $C_7$ respectively. The power output valve $V_3$ is a co-planar grid type requiring an external grid bias battery of about 60 v. The grid bias circuit is decoupled by $R_{20}$ and $C_8$.

Feedback is applied from a bridge output circuit, $R_{18}$ in parallel with $C_{14}$ and $R_{21}$, being one of the two voltage feedback arms, and $R_{17}$ the other, while $R_{16}$ is the current feedback arm. The D. C. anode current passes through the output choke $L_3$ while any A. C. currents in the latter are fed back to the cathode via $C_{12}$. All the components of the feedback circuit including the output transformer are at cathode potential as regards D. C. due to the isolating condenser $C_{13}$.

The output transformer $T_3$ (ratio 4000 to 600 ohms) is double shielded in the same way as the input transformer while $C_{15}$ is inserted to correct the angle of the output impedance. The feedback circuit itself is the bridge type approximately balanced, with the impedance looking into the high side of the transformer matching the impedance looking into the amplifier from the transformer high impedance winding.

The impedance last referred to is governed entirely by values of the three bridge arms, and to obtain a fine control of the impedance at the high end of the range the top arm of the bridge is split into two sections $R_{18}$ and $R_{21}$, a small condenser $C_{14}$ being paralleled across $R_{18}$. The arm is split into two parts since the minimum capacity of the condenser has too great an effect at 170 kc. when inserted across the whole of the arm. The diagonal of the feedback bridge forms a part of a potentiometer, the ratio of the tapped portion applied to the input to the whole diagonal being $$\frac{R19}{R26+R19}$$

The other components in the diagonal perform the duty of either stabilizing the amplifier outside the pass range or correcting the gain at the extreme edges of the pass range.

To correct the phase of the $\mu\beta$ path at high frequencies the resistance $R_{19}$ is made inductive, about 5 mH. approximately. Its inductance is not high enough to affect the gain at the high end of the pass range. $C_{16}$ with a limiting resistance $R_{25}$ across it, is inserted to correct the phase at low frequencies. This low frequency phase correcting circuit causes a fall off in the gain characteristic at low frequencies in the pass range and to compensate for this a gain correcting circuit $R_{27}$ and $C_{17}$ in parallel is inserted in series with $R_{26}$. At low frequencies outside the pass range $C_{17}$ presents a much higher impedance than $R_{27}$. Thus the value of $R_{27}$ determines the magnitude of the combined impedance. This is made small so as to have a negligible opposition effect to $C_{16}$ which has a much higher limiting resistance across it.

The amplifier is operated from 24 v. and 130 v. supplies connected in series, to allow a maximum of 150 v. for the anode supplies. $L_2$ is the 130 v. decoupling choke with its associated condenser $C_9$. The screen supply for the last valve is obtained by a potentiometer across the 130 v. supply, $C_{10}$ providing a path for the A. C. currents to cathode.

To overcome the fundamental difficulties of using two earths, i. e. rack earth and filament earth, the following arrangement is used.

All three cathodes are taken to a common centre point which is rack earth via $C_{11}$. Also a high impedance is inserted in the path to filament earth in the shape of $L_1$. The two windings of the latter are connected such that if terminals 2 and 4 are shorted the windings will be in series opposition. The effect of utilizing rack earth as virtually the sole earth of the amplifier is to cut down crosstalk between amplifiers on the same battery supplies very considerably, since circulating currents from the input circuit to rack earth and back again to cathode via filament earth are suppressed.

Grid resistances $R_1$, $R_7$ and $R_{11}$ are connected as close to the grid of each valve as physically possible to reduce phase change through the $\mu$ path at high frequencies and to prevent single stage parasitic oscillations.

The alarm circuit consists of a relay S1 operated by the plate currents of the first two tubes, its contacts operating an alarm lamp LS1 when de-energized. When either a filament current plug or a dummy plug is inserted the alarm lamp circuit is broken by contacts of the jack J1 thus preventing an alarm being given. Plate currents are determined by means of the small resistances $R_{22}$, $R_{23}$, $R_{24}$, inserted in the plate circuits of each of the three tubes, the voltage across them being proportional to the current.

Having now particularly described and ascertained the nature of our said invention and in what manner the same is to be performed, we declare that what we claim is:

1. A negative feedback amplifier comprising input and output amplifying units, a transformer coupled to said input unit for applying input signals thereto, a potentiometer connected across the secondary winding of said transformer, the moving arm on said potentiometer being connected to said input circuit, a feedback connection from said output amplifying unit to one end of said potentiometer, and means connected between said one end and said moving arm of said potentiometer for compensating for changes in the impedance of said transformer with changes in gain.

2. A negative feedback amplifier according to claim 1 in which said last-mentioned means comprises a condenser for compensating for changes in the capacity of the windings of said potentiometer with respect to a neutral point in said circuit.

3. A negative feedback amplifier comprising an odd number of amplifying stages each including a vacuum tube having a cathode, grid, and anode, said cathodes being short-circuited to ground, a transformer for applying input signals to the first of said stages, a potentiometer connected across the secondary winding of said transformer and having a sliding terminal connected to the grid of said first stage, a voltage divider connected between the anode of the last of said stages and ground, a negative feedback connection between a tapping point of said voltage divider and one end of said potentiometer, a resistance connected between said one end of said potentiometer and ground for developing the negative feedback voltage thereacross, and a condenser connected between said sliding terminal and said one end of said potentiometer whereby the input impedance of said transformer remains substantially constant.

ALLEMAN HOLLY ROCHE.
ALAN JEFFERY BUXTON.

REFERENCES CITED

The following references are of record in the file of this patent:

UNITED STATES PATENTS

| Number | Name | Date |
|---|---|---|
| 2,246,158 | Worcester, Jr. | June 17, 1941 |
| 2,255,679 | Riddle, Jr. | Sept. 9, 1941 |
| 2,302,493 | Dome | Nov. 17, 1942 |
| 2,315,312 | Brown | Mar. 30, 1943 |